April 25, 1961  J. O. WHITE, JR  2,981,888
ELECTRICAL CURRENT MEASURING SYSTEM
Filed July 19, 1955
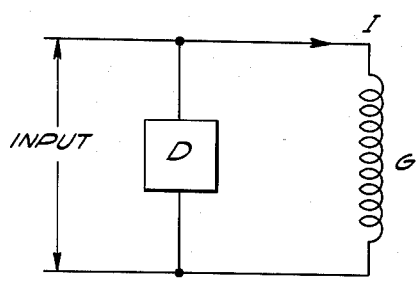
FIG. 1.
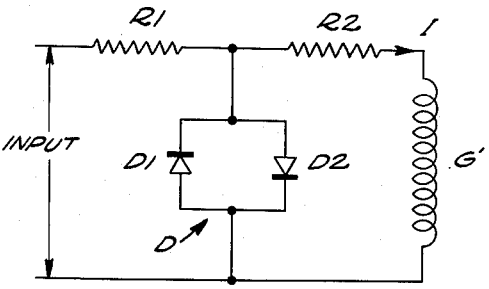
FIG. 2.
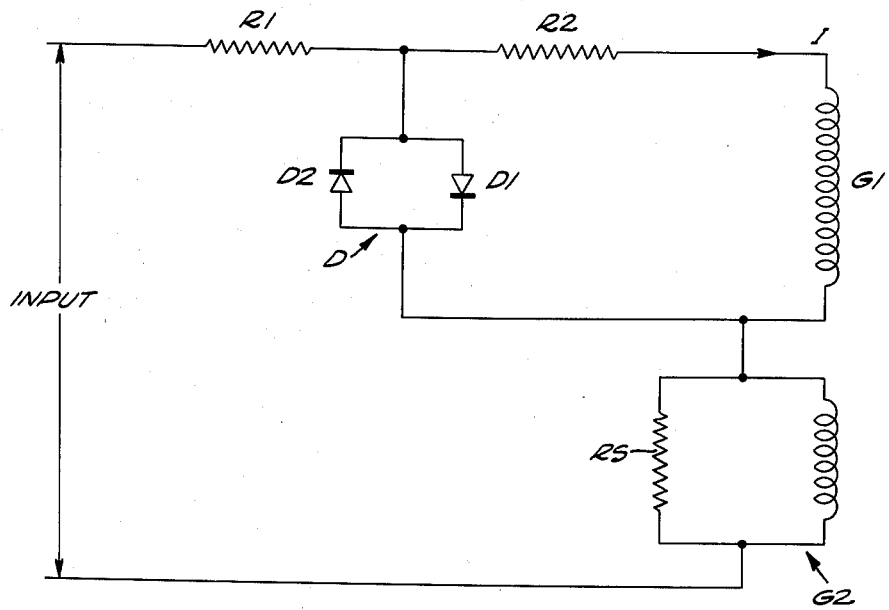
FIG. 3.
JAMES O. WHITE, JR.
INVENTOR.
BY 
AGENT

United States Patent Office 2,981,888
Patented Apr. 25, 1961

2,981,888

ELECTRICAL CURRENT MEASURING SYSTEM

James O. White, Jr., Norwalk, Calif., assignor, by mesne assignments, to Dresser Industries, Inc., Dallas, Tex., a corporation of Delaware Filed July 19, 1955, Ser. No. 522,932

4 Claims. (Cl. 324—115)

This invention relates to a system for measuring electrical currents which may vary over a very wide range of values; and, more specifically, to an overload protection system applicable to series-connected instruments having differing current-carrying capacities and each of which measures over a portion of such wide range of values. More particularly, the invention comprehends a system to protect the more sensitive of two instruments, such as galvanometers, having differing ranges of measurement or capacities and whose measuring or deflecting coil units are connected in series but have differing current-carrying capacities. This type or combination of apparatus may be employed in instances where a physical variable such as an electric current to be measured varies in value or magnitude over a range too great to be accommodated by any one instrument. A typical instance is that occurring in well logging operations, wherein such a physical variable as the current produced by the natural potential of an earth formation is continuously measured and the measurements recorded by suitable means such as a photo-recorder. The variations in the value of the physical variable may be so extensive that it is required, for acceptable logging, that a lower range of values be measured by an instrument of greater sensitivity and an upper range of values be measured by an instrument of greater current-carrying capacity and lower sensitivity. Since a practically instantaneous shift of measuring from either instrument to the other is required, the two are connected in series and the instrument of greater sensitivity is protected from the overload applied to it when measuring is performed by the other instrument. Heretofore the means employed to protect the more sensitive lower range instrument have been relatively complex, expensive and unreliable. In the case of some instruments, subjecting the coils three or four times to loads such as cause more than full scale deflection has been found to result in a somewhat permanent hysteresis effect; hence the necessity for certain and adequate protection of such instruments is apparent.

It is, then, a principal object of the present invention to provide an electrical instrument overload protection system of the class indicated, which is simple, inexpensive, and reliable.

Another object of the invention is to provide an electric current measuring system adapted to continuously measure a variable current throughout a range greater than that which can be accommodated by one instrument with the desired degree of sensitivity, with means to protect the instrument measuring over the lower portion of the range of current values when currents in the higher portion of the range are supplied.

Other objects which will hereinafter be made or become apparent are attained by the invention, a preferred exemplary embodiment of which is diagrammatically indicated in the accompanying drawings, in which:

Figure 1 is a diagram employed for explanatory purposes;

Figure 2 is a second explanatory diagram; and

Figure 3 is an electric circuit diagram illustrating a complete protection system of the class envisioned by the invention, conventional electrical symbols being employed in designations of the circuit components.

In the drawings, current measuring instruments are, in general, indicated by only their respective deflection coil units, for the sake of clarity and simplicity of illustration.

Referring to Figure 1, G represents the coil unit such as a galvanometer deflection coil unit, of an instrument adapted to measure the magnitude of an electrical quantity, and through the turns of which is supplied by leads as indicated a current equal to or representing the electrical quantity. If I represents the milliampere current through coil unit G which will result in full scale deflection of the instrument, it is obvious that an applied current in excess of I may damage the instrument. If, however, there be shunted across the coil a device D which will conduct no current when coil unit G is carrying less than current I but will conduct any applied current greater than I, coil unit G will be protected against overload. A voltage representing the current carried by or passed through coil unit G may be derived across the combination of a resistor connected in series with the coil unit, as indicated in Figure 2. Therein the coil unit G' carries a milliampere current I, and is connected in series with an impedance preferably in the form of a resistor R2. The voltage drop across R2 and the resistance RG' of coil G' may be taken as indicative of the magnitude of the supplied current I, as is well known. R1 may be another resistor employed for calibration or other auxiliary purposes. If now a device of the nature of D of Figure 1 as hereinbefore described is connected as indicated to shunt coil unit G', and has such characteristics that it will pass practically no current until the voltage thereacross attains a value of $I(R2+RG')$ wherein I is the milliampere current value corresponding to the maximum safe current load for coil G', but will, upon being subjected to a voltage in excess of $I(R2+RG')$, commence conduction to an extent sufficient to by-pass all current in excess of I, then coil unit G' will be protected. A device of the required characteristics may be provided by shunting the coil and resistor combination by suitable means designated generally at D and comprising one or more diodes of proper characteristics. It will be understood that if the instrument is to operate solely on direct current of constant polarity, then one such diode is sufficient, poled or oriented in the proper electrical direction. If alternating currents are supplied for measurement, two parallel-connected, oppositely poled diodes are employed, connected in shunt as indicated at D1, D2. As an example of diode which is operable in the manner and for the purposes hereinbefore indicated, the type 1N138A Silicon Junction Diode commercially available from National Semiconductor Products, 930 Pitner Avenue, Evanston, Illinois, may be cited. With a coil unit G' of known resistance and current-carrying capacity for full scale deflection of the instrument, the value of impedance required at R2 to provide a voltage which will just cause conduction through a diode having a known breakdown voltage is readily determined by application of Ohm's law. The exemplary type of silicon junction diode hereinbefore cited conducts and by-passes excess current from the coil unit G' when the applied potential exceeds 450 mv.; hence in that example $I(R2+RG')$ should be made to equal 450.

Referring now to Figure 3 in which a system of the type envisioned by the invention is portrayed in the diagrammatic form, the current-carrying deflection coil unit G1 of a first electrical instrument of relatively high sensitivity is connected in series with the deflection coil unit G2 of a second electrical instrument of relatively low sensitivity. Deflection coil unit G2, which may include a coil and a shunt RS, thus has greater current-carrying capacity than has deflection coil unit G1, and would, in the usual combination of first and second instruments, be capable of carrying a current many times larger than the maximum permissible current for deflection coil unit G1. For example, if unit G1 had a full scale current capacity of I milliamperes, coil unit G2 would have a full scale current-carrying capacity of NI, wherein N is a number greater than unity. The measurable range of values of a variable current of instant value $i$ would then extend from zero through NI, with the first instrument measuring over the lower portion of the range from zero to 1 and the other instrument being used to measure from I to NI. Since each instrument must cover its own range of measurement values, that is, provide indications for all currents within its respective range, and since the indications must be continuous with respect to time over the combined ranges of the instruments, it is evident that the large currents measured by the second instrument must in large measure be shunted around the first instrument, with prompt and effective nullification of the shunt as soon as the current falls below the full scale deflection value of the first instrument. This desired automatic and instantaneous shunting action is performed by a suitable diode unit, and in the apparatus indicated in Figure 3, by the combination of oppositely poled, parallel connected diodes D1 and D2 connected to shunt the coil unit G1 and a potential means R2; the diodes being of the aforementioned characteristics and such as were hereinbefore cited as exemplary. With the mentioned type and manufacture of silicon junction diode, as soon as the voltage drop across the series combination of R2 and G1 exceeds 450 mv. the diode unit or combination D commences conducting and shunting the excess of current past or around G1. A current I sufficient to maintain the required voltage drop continues to flow through R2 and G1, as is required to maintain the diode combination conductive; but as soon as the current falls below the value corresponding to full scale deflection of G1, the voltage drop across R2—G1 falls below the 450 mv. critical value and the diode unit D ceases to conduct. Then the total current is measured by the first instrument, having deflection coil unit G1.

When the diode unit (D1, D2, or both D1 and D2 connected as indicated) conducts due to the critical voltage being generated across R2—G1 and applied across it, the current thus passed through the diode unit and the current passed through G1 are combined and supplied to the second instrument, which comprises deflection coil unit G2. It will be understood that the second instrument may be of construction substantially identical to that of the first instrument, in which case its sensitivity is lowered as by provision of purely resistive shunt means RS. In the event the second instrument is of different construction than that of the first instrument, a resistive or linear shunt means such as RS, or no shunt means, may be provided, as required. In accordance with the previously expressed considerations, unit G1 is considered to represent the first instrument and unit G2 the second instrument, irrespective of whether the second instrument includes a resistive shunt such as RS. The second instrument continues to measure the current while the latter is below the full scale value for the first instrument, but only the measurement provided by the first instrument is utilized during that time. However, as soon as full scale value of the first instrument is exceeded, the diode unit commences shunting the excess current past the first instrument and the indication or record provided by the second instrument is utilized.

From the preceding description of certain features of the apparatus comprised in a preferred physical embodiment of the invention it is seen that the unique characteristic of a certain type of diode, and specifically of a silicon junction diode, of conducting in a forward direction only after a predeterminable voltage has been applied thereacross, is utilized to require flow of current to be measured through a first of series-connected instruments as long as full scale value of the instrument is not exceeded; and is utilized to by-pass or shunt around the first instrument current in excess of that corresponding to full scale value, for measurement by a second of such instruments. Further it is seen that the second of the series connected instruments, that is, the instrument of greater current carrying capacity, receives all of the current to be measured, including that shunted by the first instrument. Further, it is seen that the transition from measurement by either instrument to measurement by the other is substantially instantaneous in both directions, permitting continuous measurement of a supplied current which is permitted to vary throughout the entire ranges of both instruments.

While specific types of nonlinear shunt elements have been mentioned and explained in connection with the specific exemplary form of apparatus disclosed, other elements having the required characteristics may be employed, it being sufficient for the purposes of the invention that the elements conduct current in the forward direction only when a potential above a predetermined level is applied, and act as an insulator to potentials or currents in the backward direction. Accordingly, it is desired to be not limited to the specific details of the described embodiment of the invention, but what I claim is:

1. An electrical measuring system for measuring an unidirectional electrical current which is variable over a wide range, comprising: a first current-measuring element for measuring such current up to a predetermined magnitude; a second current-measuring element connected in series with said first current-measuring element for measuring such current above said predetermined magnitude; a semiconductor diode connected in parallel with said first current-measuring element and of such polarity with respect thereto that it may be forwardly conductive under voltages thereacross resulting from flow of such current to be measured through said first current-measuring element, said diode having the characteristic of being non-conductive forwardly at voltages below and conductive forwardly at voltages above a predetermined threshold value; and means connected to said diode and said first current-measuring element to cause the said voltage applied across the said diode to have a value approximately equal to the said predetermined threshold value when the flow of current through said first current-measuring element is equal to said predetermined magnitude.

2. An electrical measuring system in accordance with claim 1 in which said diode is a silicon diode.

3. An electrical measuring system for measuring an electrical current which is variable over a wide range, comprising: a first current measuring element for measuring current up to a predetermined magnitude; a second current measuring element connected in series with said first current measuring element for measuring such current above said predetermined magnitude; a pair of semiconductor diodes connected in opposite polarity in parallel with said first current-measuring element, such that one or the other of said diodes may be forwardly conductive under voltages thereacross, resulting from flow of current to be measured through said first current-measuring element in either direction, said diodes having the characteristic of being non-conductive forwardly at voltages below and conductive forwardly at voltages above a predetermined threshold value; and means connected to said diodes and said first current-measuring element to cause the said voltages applied across the said diodes to have a value approximately equal to the said predetermined threshold value when the flow of current through said first current-measuring element is equal to said predetermined magnitude.

4. An electrical measuring system in accordance with claim 3 in which said diodes are silicon diodes.

References Cited in the file of this patent

UNITED STATES PATENTS

| | | |
|---|---|---|
| 2,079,485 | Bousman | May 4, 1937 |
| 2,431,151 | Tellegen | Nov. 18, 1947 |
| 2,571,458 | Lawrence | Oct. 16, 1951 |
| 2,584,800 | Grisdale | Feb. 5, 1952 |
| 2,665,395 | Feinberg | Jan. 5, 1954 |
| 2,671,874 | Friedrichs | Mar. 9, 1954 |
| 2,789,254 | Bodle | Apr. 16, 1957 |

OTHER REFERENCES

Peters: abstract of application Serial Number 62,346, published Oct. 14, 1952, O.G. vol. 663, page 570.

Publication, Semiconductor Compounds, by A Coblenz at page 144 of Electronics magazine, Nov. 1, 1957.